US012574417B2

(12) United States Patent
Andrzejewski et al.

(10) Patent No.: US 12,574,417 B2
(45) Date of Patent: Mar. 10, 2026

(54) AUTOMATIC TUNING OF MANAGEMENT SYSTEM FOR INCIDENT ALERT CONTROL

(71) Applicant: Sumo Logic, Inc., Redwood City, CA (US)

(72) Inventors: David M. Andrzejewski, San Francisco, CA (US); Bashyam TCA, Walnut Creek, CA (US); Naveen Ramachandrappa, Redwood City, CA (US); Rohith Kumar Poshala, Milpitas, CA (US); Sourabh Bhosale, Redwood City, CA (US)

(73) Assignee: Sumo Logic, Inc., Redwood City, CA (US)

( * ) Notice: Subject to any disclaimer, the term of this patent is extended or adjusted under 35 U.S.C. 154(b) by 258 days.

(21) Appl. No.: 18/138,471

(22) Filed: Apr. 24, 2023

(65) Prior Publication Data

US 2024/0356973 A1 Oct. 24, 2024

(51) Int. Cl.
*H04L 9/40* (2022.01)
*H04L 41/22* (2022.01)

(52) U.S. Cl.
CPC .............. *H04L 63/20* (2013.01); *H04L 41/22* (2013.01); *H04L 63/1433* (2013.01)

(58) Field of Classification Search
CPC ...... H04L 63/1433; H04L 63/20; H04L 41/22
See application file for complete search history.

(56) References Cited

U.S. PATENT DOCUMENTS

| | | | |
|---|---|---|---|
| 8,645,250 B2 * | 2/2014 | Boding ................ | G06Q 20/405 |
| | | | 705/36 R |
| 2013/0132001 A1 * | 5/2013 | Yacout ..................... | G01D 3/10 |
| | | | 702/35 |
| 2021/0142329 A1 * | 5/2021 | Aparício ................ | G06N 5/025 |
| 2022/0012352 A1 * | 1/2022 | Boding ................. | G06N 20/00 |
| 2022/0164699 A1 * | 5/2022 | Neupane .............. | G06Q 20/405 |

(Continued)

OTHER PUBLICATIONS

Handelman, Guy S., et al. "Peering into the black box of artificial intelligence: evaluation metrics of machine learning methods." American Journal of Roentgenology 212.1. (Year: 2019).*

(Continued)

*Primary Examiner* — John M Macilwinen
(74) *Attorney, Agent, or Firm* — Schwegman Lundberg & Woessner, P.A.

(57) ABSTRACT

Methods, systems, and computer programs are presented for generating recommendations to update the severity of a rule for incident-detection. One method includes accessing a resolution status for insights generated based on an evaluation of rules, each rule associated with a weight. The method determines, based on the resolution status, if each insight corresponds to a true positive (TP) or a false positive (FP), and optimizing values for the weights of the one or more rules to lower the number of FPs. The optimizing comprises identifying an objective function based on predicted values for the insights and the insights resolution status, identifying one or more constraints, and using a solver to obtain the optimized values for the weights. A recommendation to change the weight associated with at least one rule is presented on a user interface based on the optimized values for the at least one rule.

20 Claims, 13 Drawing Sheets

(56)             References Cited

U.S. PATENT DOCUMENTS

2022/0309047 A1\*  9/2022  Seth ..................... G06F 16/217
2023/0013306 A1\*  1/2023  Williamson .......... G06F 16/285

OTHER PUBLICATIONS

Guo, Chuan, et al. "On calibration of modern neural networks." International conference on machine learning. PMLR. (Year: 2017).\*
Flach, Peter. "Performance evaluation in machine learning: the good, the bad, the ugly, and the way forward." Proceedings of the AAAI conference on artificial intelligence. vol. 33. No. 01. (Year: 2019).\*
Lin, Man, et al. "Static security optimization for real-time systems." IEEE Transactions on Industrial Informatics 5.1. (Year: 2009).\*
Jiao, Yasen, and Pufeng Du. "Performance measures in evaluating machine learning based bioinformatics predictors for classifications." Quantitative Biology 4. (Year: 2016).\*
Guillén-Gosálbez, Gonzalo. "A novel MILP-based objective reduction method for multi-objective optimization: Application to environmental problems." Computers & Chemical Engineering 35.8. (Year: 2011).\*
Oliva, Diego Gabriel, "MILP-based clustering method for multi-objective optimization: Application to environmental problems", Computers and Chemical Engineering 56, (Sep. 2013), 16 pages.

\* cited by examiner

MIXED INTEGER
LINEAR PROGRAMMING

602

| RULE | RECOMMENDATION | | | | CURRENT | | | WITH RECOMM. | | |
|---|---|---|---|---|---|---|---|---|---|---|
| | CURRENT WEIGTH | REC. WEIGTH | CHANGE | SIGNAL VOLUME | INSIGHTS COUNT | INST. TP COUNT | INST. FP COUNT | INSIGHTS COUNT | INST. TP COUNT | INST. FP COUNT |
| SUSPICIOUS IP ADDR CONNECTION | 4 | 4 | 0 | 9 | 4 | 4 | 0 | 4 | 4 | 0 |
| ACCOUNT CREATED & DELETED | 8 | 8 | 0 | 1 | 1 | 1 | 0 | 1 | 1 | 0 |
| PASSWORD ATTACK | 1 | 7 | 6 | 64 | 64 | 49 | 15 | 59 | 49 | 10 |
| ACCESS CONTROL UPDATED | 3 | 10 | 7 | 2 | 2 | 2 | 0 | 1 | 1 | 0 |
| SUCCESSFUL BRUTE FORCE ATTACK | 3 | 3 | 0 | 1 | 1 | 1 | 0 | 1 | 1 | 0 |
| OUTBOUND DATA TRANSFER OVER NON-STANDARD PORT | 4 | 8 | 4 | 3 | 3 | 3 | 0 | 3 | 3 | 0 |
| FIRST SEEN GEOLOCATION FOR THE USER | 9 | 9 | 0 | 1 | 1 | 1 | 0 | 1 | 1 | 0 |
| FIRST SEEN ACCOUNT CREATION EVENT FROM USER | 2 | 2 | 0 | 20 | 20 | 20 | 0 | 20 | 20 | 0 |
| CONSOLE LOGGING WITHOUT MFA | 4 | 1 | -3 | 17 | 17 | 4 | 13 | 6 | 3 | 3 |
| CONNECTION TO HIGH ENTROPY DOMAIN | 2 | 2 | 0 | 2 | 2 | 2 | 0 | 2 | 2 | 0 |
| HIGH RISK FILE EXTENSION DOWNLOAD | 3 | 1 | -2 | 1 | 1 | 0 | 1 | 0 | 0 | 0 |
| CLUSTER DELETED | 3 | 3 | 0 | 6 | 6 | 6 | 0 | 6 | 6 | 0 |

FIG. 6

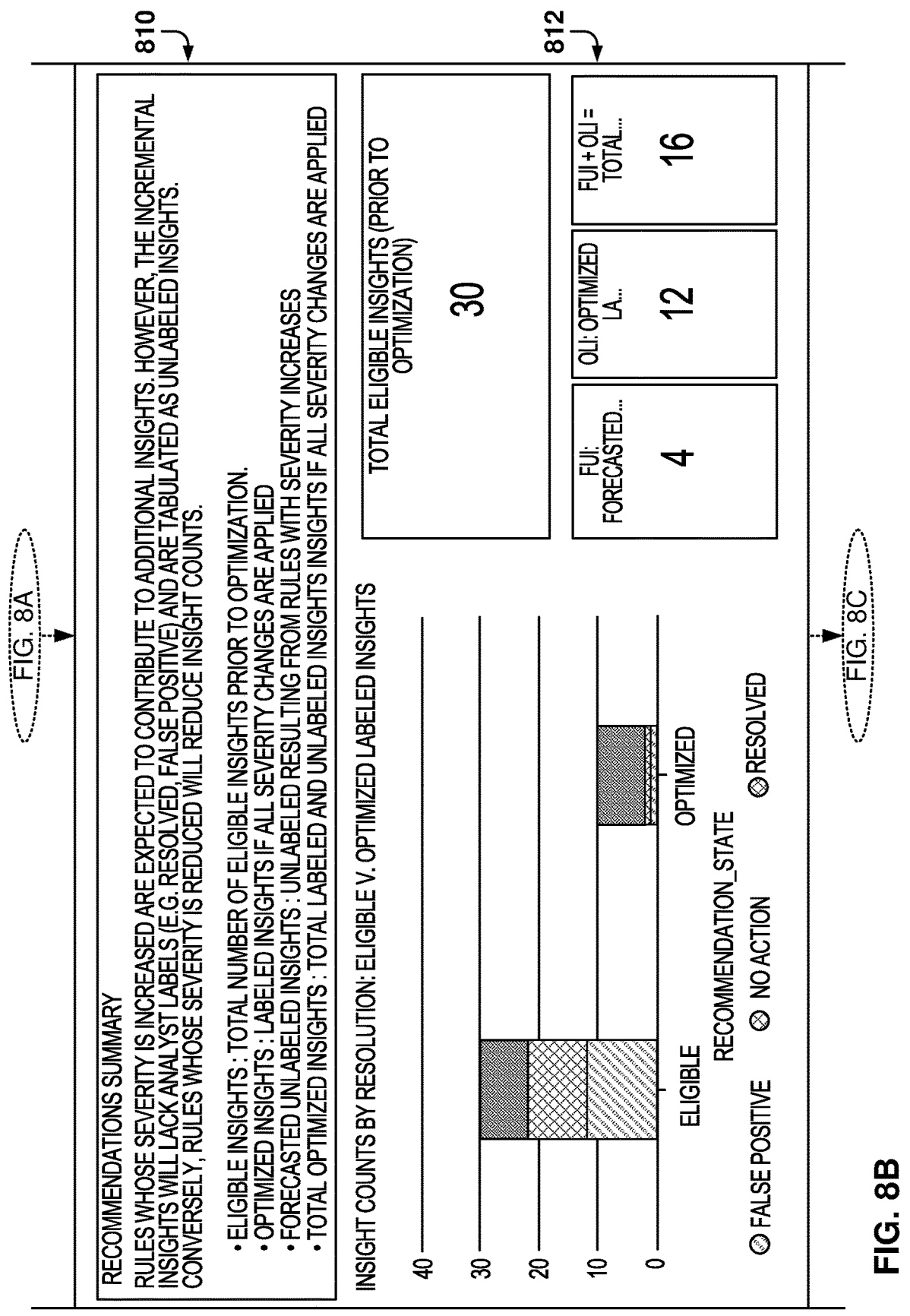

RECOMMENDATIONS SUMMARY
RULES WHOSE SEVERITY IS INCREASED ARE EXPECTED TO CONTRIBUTE TO ADDITIONAL INSIGHTS. HOWEVER, THE INCREMENTAL INSIGHTS WILL LACK ANALYST LABELS (E.G. RESOLVED, FALSE POSITIVE) AND ARE TABULATED AS UNLABELED INSIGHTS. CONVERSELY, RULES WHOSE SEVERITY IS REDUCED WILL REDUCE INSIGHT COUNTS.

· ELIGIBLE INSIGHTS : TOTAL NUMBER OF ELIGIBLE INSIGHTS PRIOR TO OPTIMIZATION.
· OPTIMIZED INSIGHTS : LABELED INSIGHTS IF ALL SEVERITY CHANGES ARE APPLIED
· FORECASTED UNLABELED INSIGHTS : UNLABELED RESULTING FROM RULES WITH SEVERITY INCREASES
· TOTAL OPTIMIZED INSIGHTS : TOTAL LABELED AND UNLABELED INSIGHTS INSIGHTS IF ALL SEVERITY CHANGES ARE APPLIED

812

TOTAL ELIGIBLE INSIGHTS (PRIOR TO OPTIMIZATION)

30

| FUI: FORECASTED... | OLI: OPTIMIZED LA... | FUI + OLI = TOTAL... |
|---|---|---|
| 4 | 12 | 16 |

INSIGHT COUNTS BY RESOLUTION: ELIGIBLE V. OPTIMIZED LABELED INSIGHTS

RECOMMENDATION_STATE

⊘ FALSE POSITIVE    ⊗ NO ACTION    ◉ RESOLVED

RECOMMENDED RULE SEVERITIES

THE FOLLOWING TABLE TABULATES SHOWS RULES THAT ARE RECOMMENDED FOR SEVERITY CHANGES BASED ON THEIR IMPACT ON RESOLVED, FALSE POSITIVE AND NO ACTION INSIGHTS. RULES WITH RECOMMENDED SEVERITY DECREASES PARTICIPATE IN FALSE POSITIVE / NO ACTIONS INSIGHTS MORE FREQUENTLY THAN RULES THAT ARE RECOMMENDED FOR SEVERITY INCREASES. BEFORE CHANGING RULE SEVERITIES, CHECK FOR THE RULE'S TUNABILITY SCORE. RULES WITH HIGH TUNABILITY SCORES ARE LIKELY TO BENEFIT FROM TUNING EXPRESSIONS BECAUSE A SMALL NUMBER OF ENTITIES CAUSE A SIGNIFICANT SHARE OF FALSE POSITIVE AND NO ACTION INSIGHTS.

- SIGNAL VOLUME - NUMBER OF SIGNALS IN WHICH THE RULE PARTICIPATED OVER THE TIME RANGE INDICATED
- ELIGIBLE: | RESOLVED - COUNT | FP - COUNT | NA - COUNT | BY RULE
- OPTIMIZED (IF RECOMMENDED SEVERITY CHANGES ARE APPLIED): | RESOLVED - COUNT | FP - COUNT | NA - COUNT | BY RULE
- TURNABILITY [0-100]: SCORES CLOSER TO 100 IDENTIFY RULES THAT WILL BENEFIT FROM TUNING EXPRESSIONS BECAUSE A SMALL NUMBER OF ENTITIES DOMINATE FALSE POSITIVE AND NO ACTION INSIGHTS

816

RULE SEVERITIES - CURRENT V. RECOMMENDED, SORTED BY TUNABILITY

| | RULE | CURRENT SEVERITY | RECOMMENDED SEVERITY | SIGNAL COUNT | TUNABILITY | ELIGIBLE_COUNT | OPTIMIZED_ COUNT |
|---|---|---|---|---|---|---|---|
| 1 | [MATCH-S00670] AWS CONFIG SERVICE TAMPERING | 6 | 2 | 50 | 80 | RESOLVED: 2 FALSE POSITIVE: 4 NO ACTION: 1 | RESOLVED: 2 FALSE POSITIVE: 0 NO ACTION: 0 |
| 2 | [MATCH=S00261] AWS CLOUDTRAIL - DATABASE SNAPSHOT CREATED | 2 | 1 | 185 | 10 | RESOLVED: 1 FALSE POSITIVE: 10 NO ACTION: 5 | RESOLVED: 1 FALSE POSITIVE: 0 NO ACTION: 0 |
| 3 | [MATCH=S00665] AWS CLOUDTRAIL - LOG GROUP DELETION | 2 | 1 | 19 | 8 | RESOLVED: 0 FALSE POSITIVE: 0 NO ACTION: 2 | RESOLVED: 0 FALSE POSITIVE: 0 NO ACTION: 0 |
| 4 | [THRESHOLD-S00093] AWS ROUTE 53 RECONNAISSANCE | 4 | 8 | 82 | 0 | RESOLVED: 5 FALSE POSITIVE: 1 NO ACTION: 1 | RESOLVED: 5 FALSE POSITIVE: 1 NO ACTION: 1 |

TUNABLE ENTITIES: TOP CONTRIBUTORS TO FALSE POSITIVE AND NO ACTION INSIGHTS

THIS TABLE SHOWS RULES THAT WILL MOST BENEFIT FROM TUNING EXPRESSIONS BECAUSE A SMALL NUMBER OF ENTITIES ARE OVER REPRESENTED IN FALSE POSITIVE AND NO ACTION INSIGHTS WHERE THE GIVEN RULE IS PRESENT. ADD TUNING EXPRESSIONS BASED ON THE ENTITIES LISTED.

- TUNABILITY [0-100] : CLOSER TO 100 FOR RULES THAT WILL BENEFIT FROM A TUNING EXPRESSION
- ENTITIES IDS - ENTITIES THAT CAN BE TUNED OUT THROUGH A TUNING EXPRESSION

818

TUNABLE ENTITIES BY RULE
02/20/2023 8:46:47 PM TO 03/22/2026 9:46:47 PM

820

| | RULE | ENTITY_ID | ENTITY_TYPE | TUNABILITY | ELIGIBLE_ COUNT | |
|---|---|---|---|---|---|---|
| 1 | [MATCH-S00670] AWS CONFIG SERVICE TAMPERING | _USERNAME-RHALLICK@INTEL471.COM | _USERNAME | 80 | RESOLVED: 0 | FALSE POSITIVE: 6 |
| 2 | [MATCH-S00670] AWS CONFIG SERVICE TAMPERING | _USERNAME-DHARAM.ANDIPARA@CRESDATASYS.COM | _USERNAME | 80 | RESOLVED: 0 | FALSE POSITIVE: 6 |
| 3 | [MATCH-S00670] AWS CONFIG SERVICE TAMPERING | | _EMAIL | 80 | RESOLVED: 0 | FALSE POSITIVE: 6 |
| 4 | [MATCH-S00670] AWS CONFIG SERVICE TAMPERING | | _IP | 80 | RESOLVED: 0 | FALSE POSITIVE: 6 |

FIG. 8D

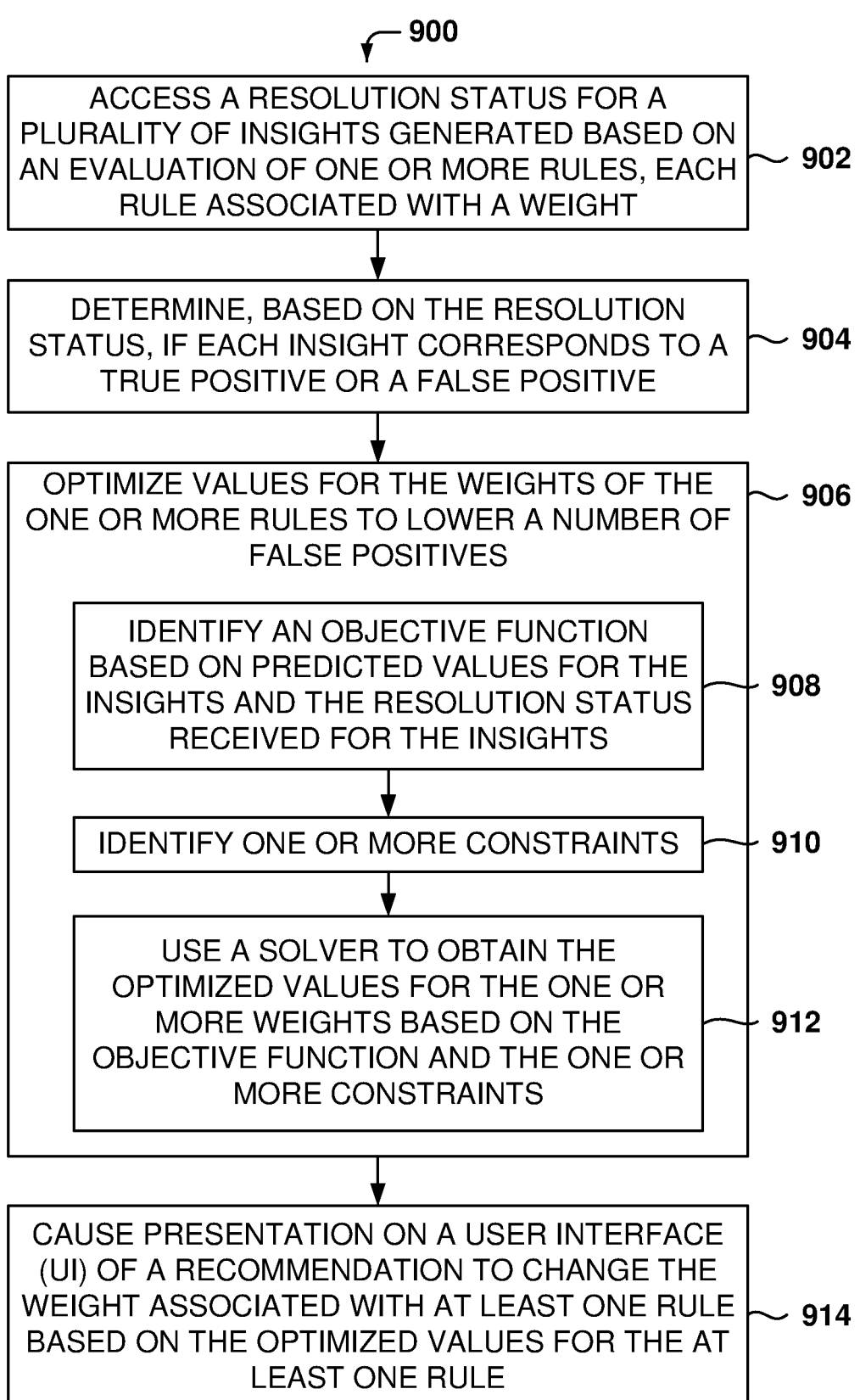

900

ACCESS A RESOLUTION STATUS FOR A PLURALITY OF INSIGHTS GENERATED BASED ON AN EVALUATION OF ONE OR MORE RULES, EACH RULE ASSOCIATED WITH A WEIGHT — 902

DETERMINE, BASED ON THE RESOLUTION STATUS, IF EACH INSIGHT CORRESPONDS TO A TRUE POSITIVE OR A FALSE POSITIVE — 904

OPTIMIZE VALUES FOR THE WEIGHTS OF THE ONE OR MORE RULES TO LOWER A NUMBER OF FALSE POSITIVES — 906

IDENTIFY AN OBJECTIVE FUNCTION BASED ON PREDICTED VALUES FOR THE INSIGHTS AND THE RESOLUTION STATUS RECEIVED FOR THE INSIGHTS — 908

IDENTIFY ONE OR MORE CONSTRAINTS — 910

USE A SOLVER TO OBTAIN THE OPTIMIZED VALUES FOR THE ONE OR MORE WEIGHTS BASED ON THE OBJECTIVE FUNCTION AND THE ONE OR MORE CONSTRAINTS — 912

CAUSE PRESENTATION ON A USER INTERFACE (UI) OF A RECOMMENDATION TO CHANGE THE WEIGHT ASSOCIATED WITH AT LEAST ONE RULE BASED ON THE OPTIMIZED VALUES FOR THE AT LEAST ONE RULE — 914

FIG. 9

AUTOMATIC TUNING OF MANAGEMENT SYSTEM FOR INCIDENT ALERT CONTROL

TECHNICAL FIELD

The subject matter disclosed herein generally relates to methods, systems, and machine-readable storage media for automatic evaluation of security-related incidents.

BACKGROUND

Security analysts work to make sure that IT environments remain safe from inside and outside attackers. The security analyst typically analyzes information generated by multiple systems to detect trouble, either because of an attack, or because a system may be malfunctioning and becoming vulnerable.

For example, security analysts look at log information that may indicate problems, such as logs indicated in error condition. Additionally, analysis tools are used to process some of the log information in order to detect potential problems and report to the security analyst.

There are several challenges for the security analyst. A first problem is the existence of blind spots where attacks may take place due to gaps in the automatic detection of problems. Second, manual workflows to process potential security threats may be slow and inefficient, and older legacy tools may lead to long investigations and response times. Third, alert fatigue may creep in because of the generation of too many alerts, many of which could be false alarms, resulting in too much time spent chasing low-priority security alerts as well as false threats.

BRIEF DESCRIPTION OF THE DRAWINGS

Various of the appended drawings merely illustrate example embodiments of the present disclosure and cannot be considered as limiting its scope.

FIG. 6 includes a table summarizing the effect of using new weights, according to some example embodiments.

FIGS. 8A-8D show another UI for presenting recommendations, according to some example embodiments.

FIG. 9 is a flowchart of a method for generating recommendations to update the severity of a rule for incident-detection, according to some example embodiments.

DETAILED DESCRIPTION

Figure 1:
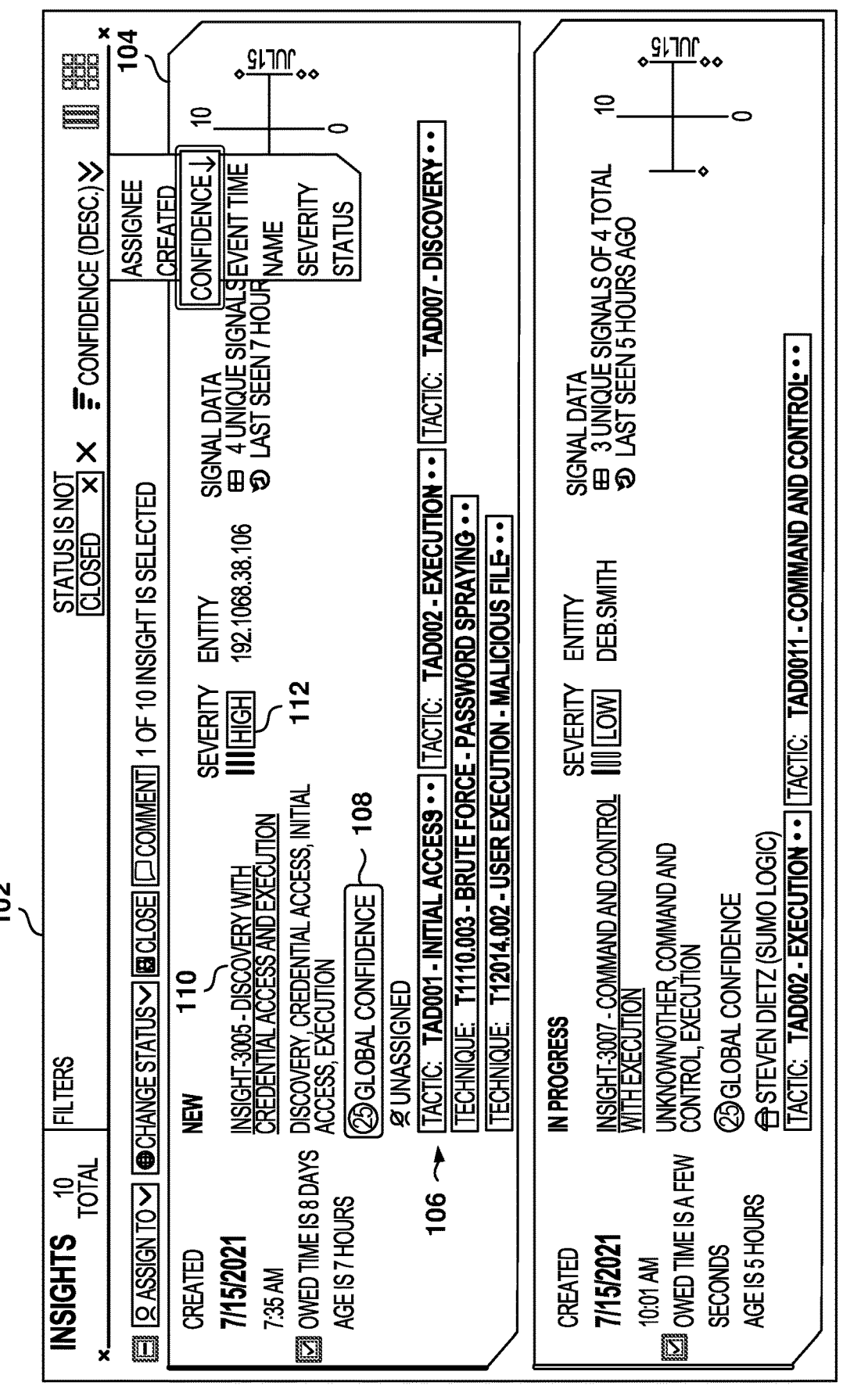
FIG. 1 is a user interface (UI) for presenting insights on security incidents, according to some example embodiments.

Example methods, systems, and computer programs are directed to generating recommendations to update the severity of a rule for incident-detection. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Security engineering teams often spend hours every week tuning their Security Information and Event Management (SIEM) systems to ensure that they are effective at detecting security threats while minimizing false positives. This ongoing tuning becomes even more complex and necessary in the face of the rapidly changing threat landscape to respond quickly and effectively to new forms of attack.

The techniques presented here for automatic tuning of rules help security engineering teams get the best returns from their efforts to tune the alert system with the least amount of effort. Just as person exercising may engage a personal trainer to get the best results for the time spent at the gym, the insight-tuning system learns from signals and insights data to identify adjustments to rule severities to optimize detections.

In one aspect, an alert for an event is generated by evaluating a set of rules, each rule with a respective value for a severity parameter (also referred to as a weight), and calculating a score based on the severity of the rules that are triggered by the event. However, if the weights of one or more rules are not properly set, the user may receive too many alerts or may miss events that should have generated alerts. A solution is presented that analyzes the resolution of events over a period of time (e.g., three months) and then calculates what should be the weight assigned to each rule in order to generate alerts for events that should trigger alerts while minimizing the generation of false alarms. If the current rule weight is different from the optimized weight, a recommendation with the new weight is presented to the user, and the user is able to configure the weights of the rules in a user interface. Additionally, the impact of changing the weight of a rule is also presented in the user interface.

One general aspect includes a method that includes an operation for accessing a resolution status for a plurality of insights generated based on an evaluation of one or more rules, each rule associated with a weight. The method further includes operations for determining, based on the resolution status, if each insight corresponds to a true positive or a false positive, and optimizing values for the weights of the one or more rules to lower a number of false positives. The optimizing comprises identifying an objective function based on predicted values for the insights and the resolution status received for the insights, identifying one or more constraints, and using a solver to obtain the optimized values for the one or more weights based on the objective function and the one or more constraints. The method further includes an operation for causing presentation on a user interface (UI) of a recommendation to change the weight associated with at least one rule based on the optimized values for the at least one rule.

FIG. 1 is an insights user interface 102 for presenting information on security incidents, according to some example embodiments. In some example embodiments, the insights system analyzes security incidents, also referred to as security events, from different sources and stores the results as records (that include raw data). These records are then matched against a set of rules, and the rules may be unique for each computer-equipment vendor.

For example, a rule is triggered when a user logs in from New York and then logs in a minute later from Moscow, or more generally, a user cannot log in from a first geography and then log in from another geography far away from the first geography within a predetermined amount of time (e.g., 1 minute, five minutes, thirty minutes, an hour). Another rule is triggered when a user failed to log in three times and then succeeded on the fourth time.

Typically, the rules are configurable, and the user may customize these vendor-provided rules to their environment. Thus, there may be system rules and user-custom rules. The system rules are created by the service provider, where a group of cybersecurity experts create these rules based on security-industry best practices. Sophisticated users can also have cybersecurity experts who can define their own custom rules, including their estimates for the weight of each rule.

Typically, the rules can be of two kinds: match-based rules and count-based rules. Each of the rules has a severity weight, also referred to herein as simply severity or weight. The severity or weight of a rule is a numerical value indicative of the potential threat to the system, or to one of the elements of the system, when the rule is triggered by one or more events, where the higher the numerical value, the higher risk to the system when the rule is triggered. For example, the rule severity may be an integer in the range from 1 to 10, 1 to 20, 1 to 50, 1 to 100, and other ranges are also possible.

When a rule is fired by incoming data (e.g., record data) then a signal is generated that has the rule weight. A signal is a collection of alerts, identified through pattern matching, correlation logic, statistical evaluation, and anomaly detection of log data. The signals may be combined, and an insight is generated when a set of signals for an entity, for a certain period, has a total sum of severity weights exceeding a predetermined threshold (e.g., the severity total exceeds a severity total of 15 for data from the last 14 days). The insights system uses an adaptive signal clustering algorithm to automatically group related signals to accelerate alert triage.

This kind of multi-reduction step based on different dimensions and time periods helps in reducing millions of alerts to a few that are critical and should be analyzed by a security expert. To help the security analyst, the insights system calculates a confidence score 108 for each insight that reflects the estimated severity of the insight. For example, the confidence score is an integer in the range from 1 to 99, with the higher the confidence level, the higher the level of danger for the threat associated with the insight.

Thus, there is a rule severity associated with each of the rules and there is an insight severity associated an insight, which is based on the combination of the severities of the triggered rules that caused the insight.

The insights user interface 102 presents information for several insights 104, including the insight name 110, the confidence score 108, an insight severity grade 112 (e.g., high, medium, or low), and tactics 106 with suggestions for solving the problem.

The confidence score 108 is the probability that the insight is a real threat, which is referred to as a True Positive (TP). If the threat is not a real threat, then the threat would be considered a False Positive (FP). Thus, the confidence score 108, combined with the insight severity grade 112, provides an indication to the security analyst on the urgency of responding to the incident.

Figure 2:
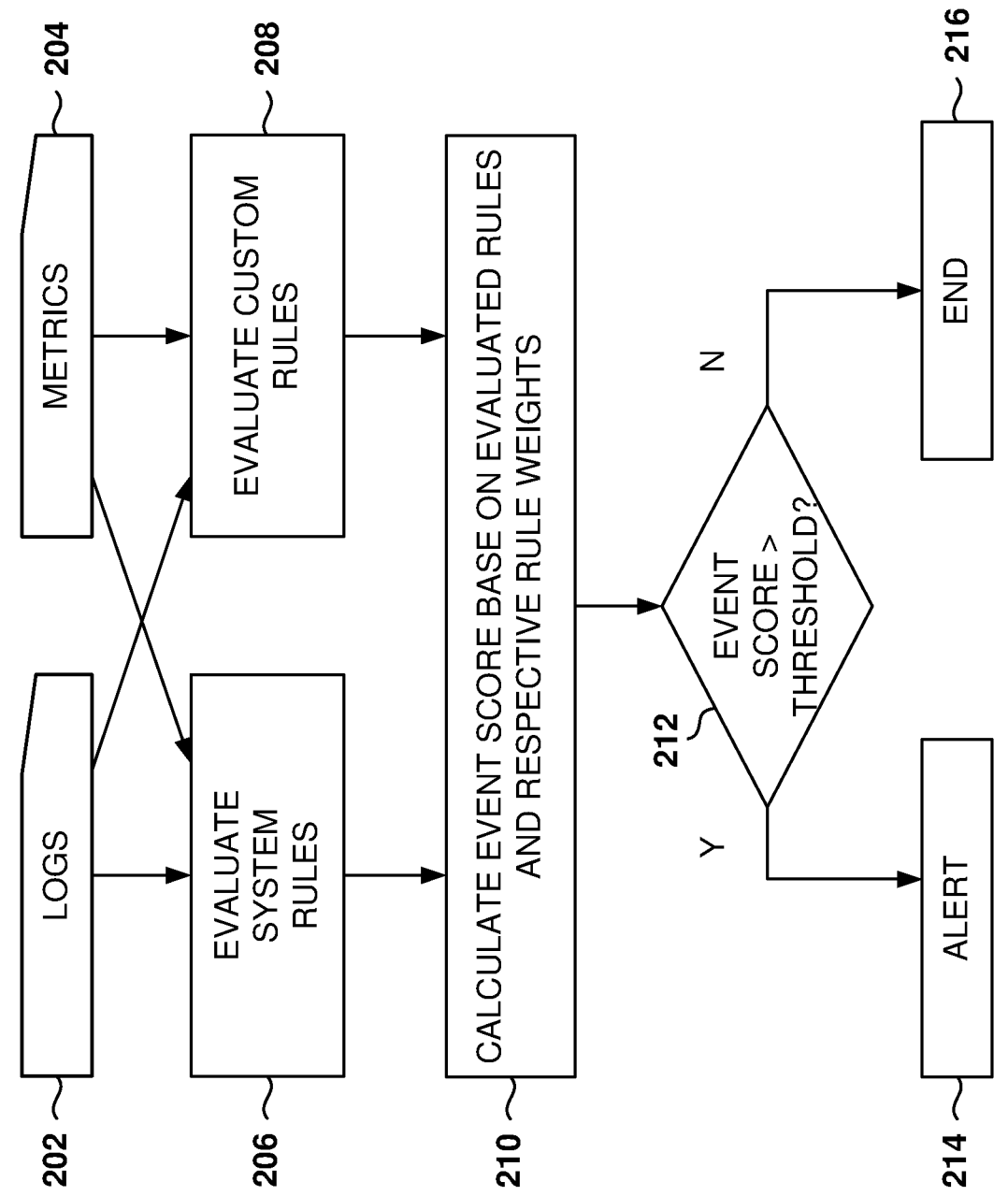
FIG. 2 illustrates the process for triggering rule-based alerts, according to some example embodiments.

FIG. 2 illustrates the process for triggering rule-based alerts, according to some example embodiments. A data collection and analysis platform ingests log data 202, which may be also saved as metrics data 204, and generates insights. A typical customer may be ingesting millions of logs in a week, and the analysis platform generates the signals when suspicious patterns are found.

For example, a user may log in to the system in the United States and then log in again two minutes later in China. A rule detects this suspicious pattern and generates a signal. The security expert then has to analyze this signal and check if it is a real threat.

At operation 206, the system rules are evaluated based on the log data 202 and metrics data 204, and a rule score is calculated for each rule (e.g., in the range from 0 to 10 or 0 to 100). For example, if a rule is not triggered, then the rule score is set to 0. Similarly, at operation 208, the user custom rules are evaluated based on the log data 202 and metrics data 204, and a rule score is calculated for each rule (e.g., in the range from 0 to 10 or 0 to 100).

At operation 210, the event score is calculated based on the evaluated rules, system and custom, and their respective weights. There could be hundreds or thousands of signals, so the process to sort through all these signals can be very expensive in the use of resources, both human and computing. If there are many signals attached to a single entity within a certain period of time, then it is assumed that some event of interest occurred. An entity could be a host, a user account, a firewall, a network switch, a database, a virtual machine, or any other kind of resource in the computing environment.

From operation 210, the method flows to operation 212 when a check is made to determine if the event score is greater than a predetermined threshold (e.g., 70 out of 100). If the event score is greater than the threshold, an alert 214 is generated for the insight, and if the event score is not greater than the threshold, then the method ends for this event without generating an alarm (operation 216).

Figure 3:
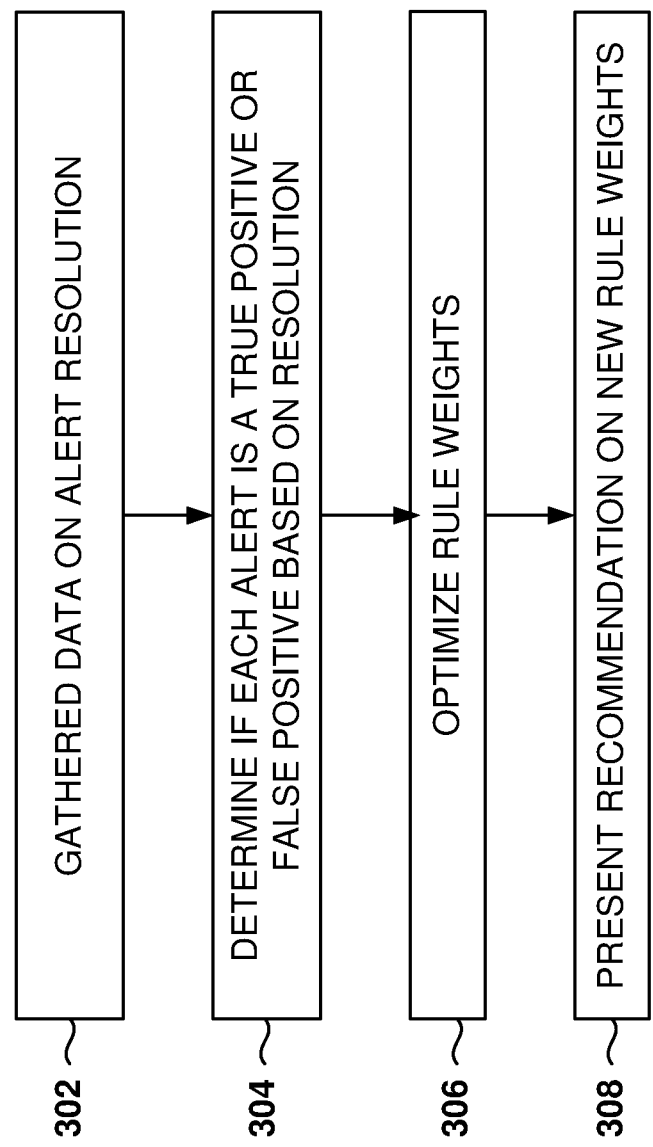
FIG. 3 is a flowchart of a method for optimizing rule weights, according to some example embodiments.

FIG. 3 is a flowchart of a method for optimizing rule weights, according to some example embodiments. Some companies divide responsibility between security-detection engineers and the Security Operations Center (SOC) teams. The latter are the first line responders for security incidents while the former administer and tune the insights platform for detection efficacy.

A typical process for tuning SIEMs involves the following steps: First, gather feedback from the SOC team to assess the latest security findings, including rules that seem to be noisy and causing a high number of false alarms. Second, refine the detection rules, where the security-detection engineers analyze insights and signals from noisy rules and assess if particular users or machines dominate false positives. Once the activity from these users and machines are verified, security engineers create tuning expressions that mute signals from these users, deactivate the rules, or lower the severity of these rules. Third, repeat the process periodically, e.g., weekly.

For completeness, security engineers also assess new and emerging threat patterns from penetration testing, or other means, and add new detection rules, initially as prototype rules, where they gather detection efficacy data, before finalizing severities for them.

There are many inefficiencies in this process, including:

The tuning process is manual. There is only so much analysis security teams can do through log searches that it is unlikely for the tuning process to be comprehensive;

Finding optimal rule severities involves trial and error.

Setting severities too low on high efficacy rules can miss real threats while setting them too high or low efficacy rules can result in too many false alarms;

Given that security teams focus on FPs exclusively, security team fail to assess if certain rules are particularly helpful for detecting real threats or TPs;

Determining Tuning Expressions for noisy entities is a manual activity and unlikely to be comprehensive;

New detection rules tend to be noisy.

Tuning has to be a continuous process as the threat, application, and infrastructure landscape is constantly changing.

The provided embodiments are designed to alleviate the manual tuning burden and maximize detection efficacy while still aligning with established security engineering processes.

At a high level, the tuning algorithm calculates rule severities that accomplish the following goals: preserve TP/resolved counts, minimize FPs, and (optionally) minimize no-action resolutions (this option is appropriate for users who use FP and no-action resolution states interchangeably.

Both system and custom rules are included in the severity recommendations, and the algorithm recommends severity increases for rules that consistently contribute to TP insights. Conversely, rules that consistently contribute to FP insights are recommended for severity reduction.

In addition to rule severity recommendations, the insight trainer also identifies noisy entities through a tunability score. High-tunability score rules are those whose FP insights are caused by a small number of entities. Such rules would benefit from tuning expressions to suppress noisy entities, especially, if such entities are verified to be safe.

To use the insight trainer, the following workflow is recommended: 1. review severity recommendations by rule; 2. assess dominant entities in FP/no-actions through rule tunability scores; 3. evaluate and add tuning expressions for dominant entities, where possible; and 4. Adjust rule severities for other rules.

Regarding the flowchart in FIG. 3, at operation 302, data is gathered regarding alert resolutions. After an alert for insight is generated, the security analyst uses the information from the insight to find out what caused the problem. After the security analyst makes a determination on the insight, (e.g., there is a hard drive malfunctioning, a host is under attack, a network switch is down), the result is saved in the system and the analysis platform captures the insight resolution. In some example embodiments, some insights may not get a resolution label from the analyst. In these cases where a label was not provided, the confidence score may be used to create an artificial label to label the insight as a TP when the confidence score is above a predetermined threshold (e.g., confidence score is greater than 97%); otherwise, the insight is artificially labeled as a FP.

However, there could be hundreds or thousands of signals, and hundreds of incident reports, so it may be a daunting task to sort through all the potential problems. To assist the security analyst, the analysis platform analyzes each insight and provides an estimated severity and a global confidence score.

The global confidence score, also referred to simply as confidence score, represents a level of confidence, predicted by the analysis platform, that the insight is actionable. In some example embodiments, the confidence score is a value in a scale of 0 to 100, where a higher score indicates higher confidence that the insight is actionable. If the analysis platform does not have enough information, it will not make a prediction and no confidence score is reported with the insight.

At operation 304, a determination is made to determine if each alert corresponded to a true positive (TP) (an actual problem occurred) or to a false positive (FP) (no actual problem occurred). Previously, the data collection and analysis platform kept track of the insight outcomes, including if the insights corresponded to the TP or the FP. In some example embodiments, the data collection and analysis platform stores the stream of all rules that ever fired, as well as insight information, in order to be able to evaluate the performance of the rules over time (e.g., a certain rule produces too many false positives).

At operation 306, the rule weights are optimized, that is, an analysis is performed to determine a recommended weight for each rule according to a set of criteria. The set of criteria may include setting a maximum threshold on the percentage of alerts that are FPs (e.g., more than 35% of alerts associated with the rule are FPs), but other criteria may also be used. More details about the weight optimization process are provided below with reference to FIGS. 4-6.

Part of the optimization process includes determining what would have happened in previous events if the rule had a different weight. For example, the number of alerts would be ten percent lower if the rule weight were 12 instead of 14, or the number of FPs would decrease from 15% to 12% if the rule weight were 30 instead of 35. This is why information on all the triggered events is kept in order to perform the optimization.

The analyst judgments are used, in a data-driven process, to retune or optimize the weights of the rules, and then alternative recommendations are presented to the users, at operation 308, with new recommended rule weights to improve the quality of the downstream insight collection.

Figure 4:
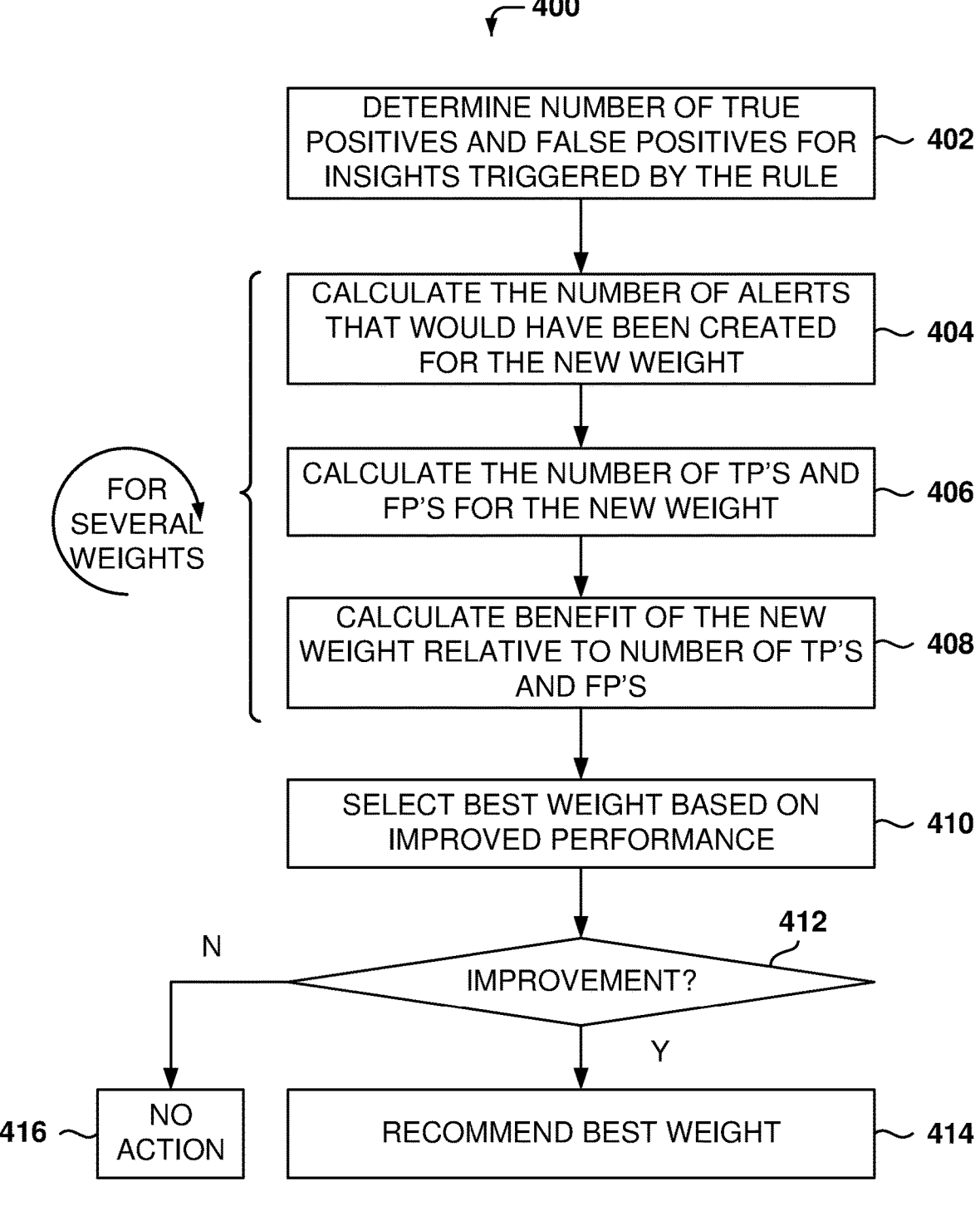
FIG. 4 is a flowchart of a method for recommending a new weight for a rule, according to some example embodiments.

FIG. 4 is a flowchart of a method 400 for recommending a new weight for a rule, according to some example embodiments. While the various operations in this flowchart are presented and described sequentially, one of ordinary skill will appreciate that some or all of the operations may be executed in a different order, be combined or omitted, or be executed in parallel.

The method 400 illustrates a process for optimizing the weight of a single rule. However, a better optimization process is to optimize the weights of several rules simultaneously because insights are usually created based on the triggering of multiple rules. More details on optimizing multiple weights are provided below with reference to FIG. 5.

At operation 402, the number of TPs and FPs for insights triggered by the rule are determined. Afterwards, operations 404, 406, and 408 are performed for a plurality of weights.

At operation 404, the number of alerts that would have been created with the new weight is calculated, and at operation 406, the number of TPs and FPs is calculated for the new weight.

At operation 408, the benefit of the new weight is calculated based on the number of TPs and FPs that the new weight would have caused.

At operation 410, the best weight from the plurality of weights is selected based on the performance improvement of each weight. In some example embodiments, the performance is calculated based on the improvement in the number of TPs, or the decrease of FPs, or the relationship between the new number of TPs and the reduction of FPs. That is, there may be a tradeoff between a reduction of FPs and the reduction of TPs. For example, the new weight is considered an improvement if the number of FPs is reduced by at least five percent while the number of TPs does not decrease more than one percent, but other thresholds are also possible.

Operations 404, 406, 408 and 410 define an optimization process, which is simple when dealing with one rule at a time. However, when multiple rules are evaluated simultaneously, the complexity of optimizing the weight grows exponentially. For optimizing multiple weights simultaneously, different optimization algorithms may be utilized that try to optimize multiple parameters of a system at the same time. In some example embodiments, the optimization process called Mixed Integer Linear Programming (MILP) is used to optimize weights for multiple rules, as described in more detail below with reference to FIG. 5.

At operation 412, a check is made to determine if there is at least one weight that improves performance. If no weight provides the desire improvement, at operation 416, no action is taken; however, if at least one weight provides an improvement, at operation 414, the identified best rule weight is recommended to the user.

Figure 5:
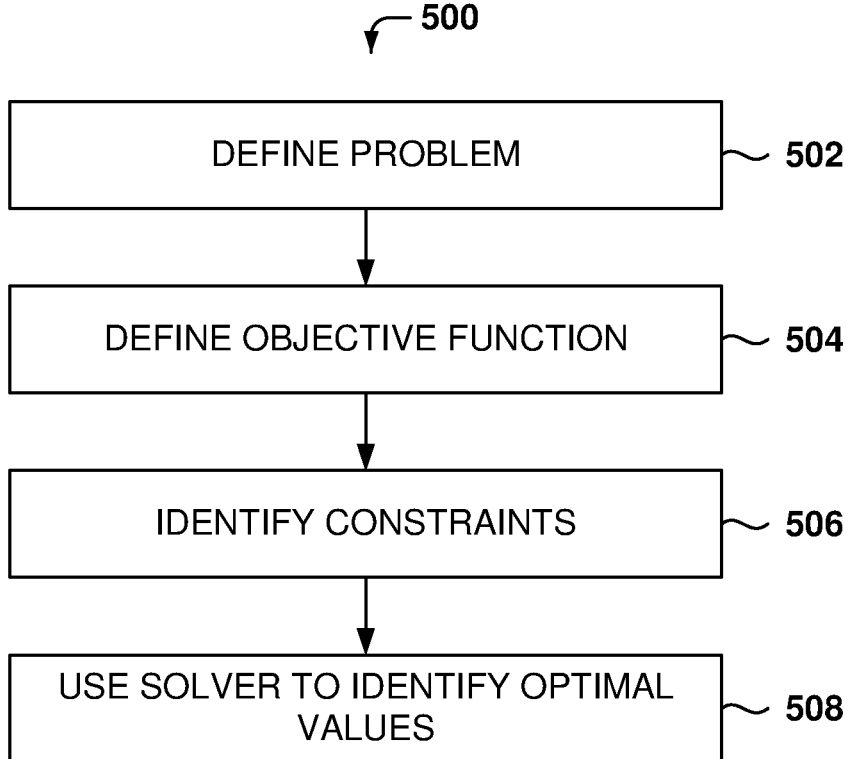
FIG. 5 is a flowchart of a method for optimizing weights for a plurality of rules using Mixed Integer Linear Programming (MILP), according to some example embodiments.

FIG. 5 is a flowchart of a method 500 for optimizing weights for a plurality of rules using Mixed Integer Linear Programming (MILP), according to some example embodiments. While the various operations in this flowchart are presented and described sequentially, one of ordinary skill will appreciate that some or all of the operations may be executed in a different order, be combined or omitted, or be executed in parallel.

Operation 502 is for defining the problem to be solved using MILP. The definition includes creating a mathematical optimization model and includes defining the decision variables.

At operation 504, an objective function is defined.

At operation 506, the constraints for the problem are identified.

Further, at operation 508, a MILP solver is used to identify the optimal values for the decision variables. Some MILP solvers include Gurobi, CPLEX, and SCIP, but any MILP solver may be used. The solver will receive as input the defined optimization model and solve for the optimum values.

If the problem is feasible, the solver will provide a solution that satisfies the constraints and optimizes the objective function. If the problem is infeasible, the solver will output that there is no feasible solution that satisfies all the constraints.

In some cases, several iterations of the solver may be used to refine the optimization model and re-solve the problem until a satisfactory solution is found.

As described above, insights are collections on per-entity signals. For a given customer, each candidate insight X(i) represents the set of associated signals s(i,j), each of which was generated by some rule r with severity weight w(r). In some example embodiments, the insight algorithm decides whether a candidate insight X(i) should be flagged as an insight by testing whether the sum{for all s(i,j)∈X(i)} of all w(s(i,j)) is greater than a threshold T. This is referred to as insight decision Z(i) for insight i: X→{0, 1}, where 0 indicates "no insight" and 1 indicates "insight created".

For the insights which are created (those with Z(i)=1), the user can provide a feedback label. This labeling function L is for assigning a label Y(i), to an insight X(i), with one of three values: {0, 1, 2} where 0 indicates "no label", 1 indicates "False Positive", and 2 indicates "True Positive." Further, the existing scoring function $f$ is be considered as an estimate of the probability that a given insight corresponds to a true positive, that is, $f(X(i))=\hat{P}(Y(i)=2|X(i))$. The goal of the optimization is to determine recommendations for new severity weights w(i) associated with respective rules r(i).

Security professionals are reluctant to ever miss anything, and they do not want to miss any alerts for events that should be investigated. Thus, one constraint of the optimization is that the system should not miss TPs, or miss a small number of TPs (e.g., less than 2% of the events). And the other constraint is to suppress the maximum number of the FPs.

For rule weight optimization, two different methods are presented, referred to as the insights-based formulation and the signals-based formulation.

The primary information available are the insight-level user feedback labels Y(i). A key design question is to define what it means to optimize the weights. In some example embodiments, the goal is to maximize the identification of TPs (Y(i)=2) insights while minimizing flagging of FPs insights (Y(i)=1).

For the insights-based formulation, given a dataset of candidate insights X(i) mapping to one-hot signal vectors s(i) along with customer labels Y(i) or inferred confidence scores $f(X(i))$, the MILP optimization problem is formulated as follows:

Set rule weights w(r);

Set insight algorithm decision z(i) for insight i;

Set objectives to optimize w(i), z(i), and u(i), where u(i) is a convenience variable to linearize the absolute value objective of $|z_i-p_i|$, which is the absolute difference between the predicted and the actual values.

Set objective to minimize $\Sigma_i|z(i)-p(i)|$, where z(i) is the insight algorithm decision, and p(i) is a label variable corresponding to actual customer true or false positive judgements Y(i) OR Confidence Scores $f(X(i))$. This is subject to constraints guaranteeing that candidate insights are flagged as insights if, and only if, the sum of the constituent signal weights exceeds the threshold T.

Set objective to minimize $\Sigma_i u(i)$ with the following constraints:

a) $\forall i(z(i)-p(i))\leq u(i)$ b) $\forall i-(z(i)-p(i))\leq u(i)$, where u(i)≥0 c) $w^Ts(i)-T(z(i))\geq 0$, where $w^Ts(i)$ is the inner product of the rule weight and active signals s(i), and T stands for the threshold to trigger the rule, and this condition ensures that when z(i) is 1, then the weights of the signals is greater than the threshold T.

d) $-(w^Ts(i)-T)+w_\Sigma z(i)\geq 0$, ($\Sigma$ is a large constant such that $w_\Sigma>\Sigma_r w(r)$) ensures that $w^Ts(i)>T$. Constraints c) and d) ensure that decision z(i) occurs only if $w^Ts(i)>T$.

In some cases, and additional constraint may be used force that the "recall" (TP/(TP+FN)) is greater than a predefined threshold (e.g., 95%). This is a security-domain customization to place more emphasis on not missing TP incidents.

In the signals-based formulation for the rule weight optimization is based on signals. The volume of signals generated by a rule are not influenceable by the rule weight. Signal volume associated with a rule is assumed, and it is influenced by whether the particular security product is popular (e.g., Palo Alto Firewall), quality of detection, the security posture of the customer, etc.

Further, whether a rule participates in an insight (referred to as "Participation Rate of Rule") depends on its weight and the weight of other time-adjacent rules on the same entity. Higher-weight rules should result in more insights associated with the given rule, after normalizing for signal volume. Further, for a given entity, a question is, subject to getting a signal of severity w, what is the distribution of severities for the next signal on that entity? One hypothesis is that if the distribution of the next signal is Poisson, for example, it will be observed a tendency of high-weight rules followed by relatively low-weight rules and vice versa.

Additionally, whether a rule participates in a FP or a TP insight is influenced by the security analyst assessment of the insight alone. In that sense, it is assumed that TP/FP insight participation rate of a rule is a "given" that can be learned from the data.

In the signals-based formulation, the goal is to maximize the true positive signals while not increasing the workload on the security analysts by keeping, in an approximate sense, the insight count constant. At a high level, the goal is to adjust the weights of the rules such that, historically, there are fewer false positives but still cover the true positives.

In some example embodiments a global model is defined to maximize an objective equal to:

$$\sum_r |s(r)| \cdot IPR(r, \text{w\_opt}(r)) \cdot \text{TP\_rate}(r)$$

Further, s(r) is the set of signals emitted by rule r, |s(r)| is the volume of signals originated by s(r), IPR(r, w_opt(r)) is the insight participation rate for the rule r, w_opt(r) is the optimized weight of rule r, and TP_rate(r) is the TP rate for rule r. Additionally, w_current(r) is the current weight of rule r, and IPR(r, w_current(r)) is the insight participation rate with the current weight of r.

The model is subject to a linear constraint and to a non-linear constraint. For the linear constraint, the weight w(r) of rule r is a value between 0 and 10, that is w(r)∈[0, 10], but other embodiments may utilize other weight ranges (e.g., 0-20, 0-50, 0-60, 0-100).

Another constraint is:

$$\sum_r |s(r)| \cdot IPR(r, \text{w\_current}(r)) \cdot \text{w\_opt}(r) \le$$
$$\sum_r \text{w\_current}(r) \text{ over } \{Z(i) = 1\} \cdot \text{Lambda}$$

Another constraint is:

$$|s(r)| \cdot IPR(r, \text{w\_current}(r)) == \text{promoted\_signals\_count}$$

Here, promoted_signals_count, is the number of signals that participated in the insights. Further, constraints are defined for each customer IDentifier (ID) with a sharing lambda value. The system rules are prepended with customer ID similar to custom rules. Further, the inequality is switched if the value of ($\sum_r$ w_current(r) over {Z(i)=1}) is ≤0, which implies the following:

$$\sum_r \text{promoted\_signals\_count} \cdot \text{w\_opt}(r) \le$$
$$\sum_r \text{w\_current}(r) \text{ over } \{Z(i) = 1\} \times \text{Lambda}$$

The non-linear constraint is the following:

$$\sum_r |s(r)| \cdot IPR(r, \text{w\_opt}(r)) \cdot \text{w\_opt}(r) <=$$
$$\sum_r \text{w\_current}(r) \text{ over } \{Z(i) = 1\} \times \text{Lambda}$$

For this non-linear constraint, |s(r)| is the signal count for rule r, and the IPR(r, w_opt(r)) for any rule r is "yes," by fitting the line y=ax by learning a linear regression. This learnt constant and the multiple with w_current(r) are used for the objective function. Further, in the constraint, IPR(r, w_current(r)) is calculated based on the existing promoted signals divided by the signal count.

Further, the w_current(r) is the current rule weight for rule r, and w_opt(r) is the decision variable for rule r. Additionally, {Z(i)=1} is the current (pre-optimization) set of insights, and (Lambda>=1) is a constraint relaxation parameter to be increased in steps in case the MILP has no feasible solutions.

Another embodiment for implementing MILP is based on a per-entity model, and the goal is to maximize the following:

$$\sum_r |s(r)| \cdot IPR(r, \text{w\_opt}(r)) \cdot \text{TP\_rate}(r)$$

Subject to the following conditions:
w(r)∈[0, 60] (although other ranges for the rule weights may be used);

$$-\sum_e \sum_r |s(r)| \cdot IPR(r, \text{w\_opt}(r)) \cdot \text{w\_opt}(r, e) \le$$
$$\sum_r \text{w\_current}(r) \text{ over } \{Z(i) = 1\} \cdot \text{Lambda}$$

The IPR(r, w_opt(r)) for rule r is impacted by rule weight w(r), and w_opt(r, e) is the decision variable (e.g., the optimized weight) for rule r for a given entity e. The Entity Criticality can be formulated as w_opt(r, e)/w_current(r).

FIG. 6 includes a table 602 summarizing the effect of using new weights, according to some example embodiments. The table includes one row for each rule. In the illustrated embodiment, the rules include the following: suspicious IP address connection, user account created and then deleted, password attack, access control updated, successful brute force attack, outbound data transfer over nonstandard port, first seen geolocation for user, first seen account creation event from user, console login without Multi-Factor Authentication (MFA), connection to high entropy domain, high risk file extension download, and cluster deleted.

Other rules may include: threat intel match—IP address, user account created and deleted in 24 hours, Amazon Web Services (AWS) WAF (Web Application Firewall) access control list updated, AWS cloudtrail—create user action observed, AWS cloudtrail—access key action detected, AWS cloudwatch log group deletion, AWS cloudtrail—permissions boundary lifted, domain brute force attempt, telegram API access, intrusion scan—targeted, persistent create account, cisco umbrella—DNS request category: malware, possible dynamic DNS domain, base32 in DNS query, successful brute force, first seen geolocation for successful login, cisco umbrella—DNS request category: phishing, high-severity intrusion signature, first seen user creation from user, domain resolution in non-standard Top-Level Domain (TLD), critical severity intrusion signature, AWS console logins without MFA, connection to high entropy domain, high-risk file extension download without hostname and referrer, AWS ECS cluster deleted, mimecast—message with virus detections to recipient, AWS cloudtrail—s3 bucket public access block disabled, mimecast—message with virus detections from IP, active directory domain enumeration, successful AWS console logins—multiple countries in 1 hour, cisco umbrella—DNS request category: crypto mining, impossible travel—successful, hexadecimal in DNS query domain, AWS cloudtrail—database snapshot created, and brute force attempt.

The first column is for the name of the rule. The next four columns summarize the recommendation, including current weight, recommended new weight, the change between the recommended weight and the current weight, and the signal volume, which is the number of incidents that triggered this rule.

The next three columns include information about the current weight, and the last three columns the information with the new recommended weight, where the three columns include the insights count, the count of instances with TP, and the count of instances with FP.

Thus, the user may easily see the recommendation for new weights and the changes in TP and FP counts for the current weight and the new recommended weight.

For example, for the rule "outbound data transfer over non-standard port," the change is to replace the current weight of 4 with 8. The impact would be minimal since the number of TPs (3) and FPs 0) would not change for the new weight.

However, for the rule "console login without Multi MFA," the change in weight would be from 4 to 1, which is a reduction of 3. The number of TPs would go from 4 to 3, and the number of FPs would go from 13 to 3. That is, one TP may be lost, but there would be a reduction of 10 FPs as the benefit.

It is noted that in the illustrated example, the number of insights is generally low, but in practice, the number of insights may be larger, such as in the order of several hundreds.

Figure 7:
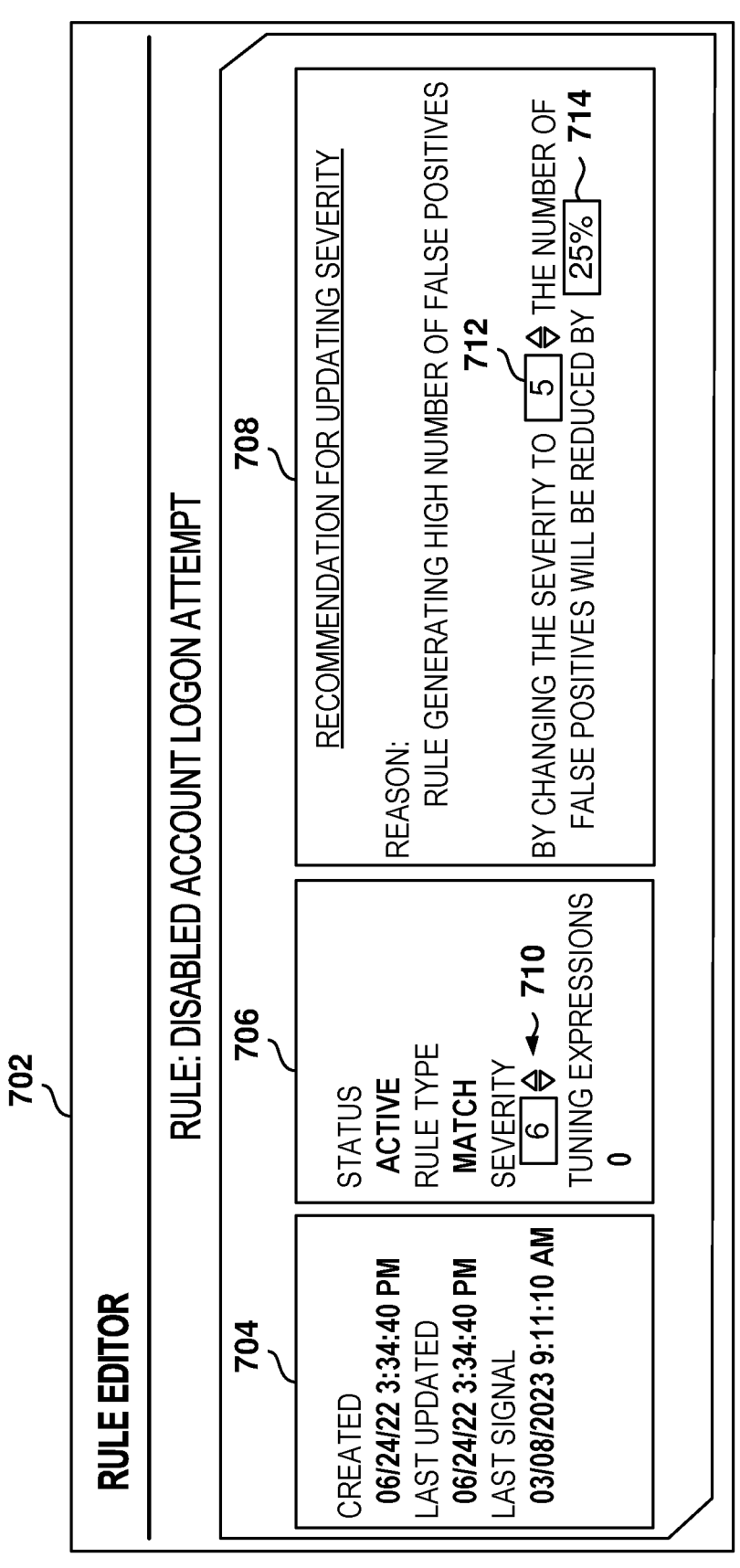
FIG. 7 is a UI with a recommendation for updating the severity of a rule, according to some example embodiments.

FIG. 7 is a UI 702 with a recommendation for updating the severity of a rule, according to some example embodiments. The UI 702 includes a name of the rule at the header (e.g., "Disabled account logon attempt"), an area 704 with timing information, an area 706 with status information, and an area 708 with the recommendation.

The area 704 includes date information for when the rule was created, last updated, and the last signal that triggered the rule. Further, the area 706 describes if the rule is active or inactive, type of rule (e.g., match, counter), and the severity or weight 710 of the rule.

The area 708 includes the reason for the recommendation (e.g., "rule generating high number of false positives"), and the impact of changing the rule. The impact states that "by changing the severity to," followed by weight entry field 712 with the value of the new weight, followed by "the number of false positives will be reduced by," followed by percentage field 714 with the percentual decrease of the number of FPs.

If the user changes the value of the weight entry field 712, the percentage field 714 will be updated based on the new value.

Other embodiments may present the recommendation with additional information, such as the information from table 602 in FIG. 6. Also, a histogram with the horizontal axis for the different weights and bars for TPs and FPs corresponding to those weights may be presented to see how the changes for TPs and FPs, or a chart with lines for the TPs and FPs may also be presented.

Figure 8A:
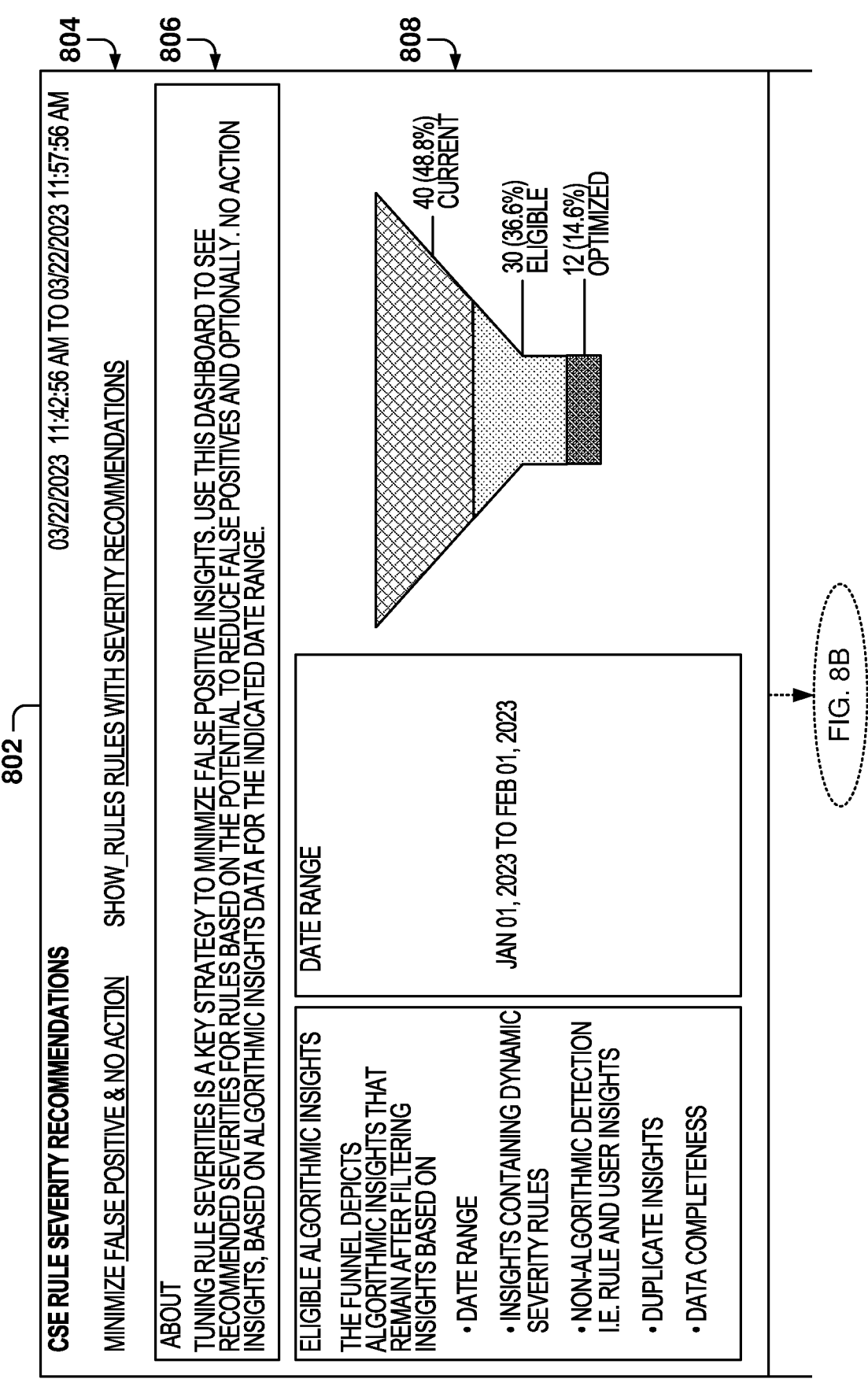

FIGS. 8A-8D show another UI 802 for presenting recommendations, according to some example embodiments. The UI 802 includes several areas. FIG. 8A presents area 804 with two input fields: a first field to enter the goal to minimize (e.g., false positives with resolution of "no action"), and a second field for filtering which rules to examine (e.g., rules with severity recommendations created by the system, rules with severity recommendations created by the user, all rules with severity recommendations).

Area 806 provides information about the UI 802, e.g., "Tuning rule severities is a key strategy to minimize False Positive insights. Use this dashboard to see recommended severities for rules based on the potential to reduce false positives, and optionally no-action insights, based on algorithmic insights data for the indicated date range."

Area 808 includes a graphical representation of the eligible algorithmic insights. The textual description indicates, "The funnel depicts algorithmic insights that remain after filtering insights based on: date range, insights containing dynamic severity rules, non-algorithmic detection (i.e., rule and user insights), duplicate insights, and data completeness."

The graph is a funnel showing the number of current insights prior to optimization (e.g., 40, which is 48.8%), the number of eligible insights prior to optimization (e.g., 30, 36.6%), and the number of labeled insights if the severity recommendations are adopted (e.g., 12, 14.6%).

Turning to FIG. 8B, area 810 includes a recommendations summary, e.g., "Rules whose severity is increased are expected to contribute to additional insights. However, the incremental insights will lack analyst labels (e.g., resolved, false positive) and are calculated as unlabeled insights. Conversely, rules whose severity is reduced will reduce insight counts."

Area 810 includes the description of the types of insights: "Eligible Insights: total number of eligible insights prior to optimization; Optimized Insights: labeled insights if all severity changes are applied; Forecasted Unlabeled Insights: unlabeled resulting from rules with severity increases; and Total Optimized Insights: total labeled and unlabeled insights if all severity changes are applied."

Area 812 includes insight counts by resolution, in chart form and in numerical form, including the total number of eligible insights prior to optimization, the number of forecasted unlabeled insights, the number of optimized labeled insights, and the sum of forecasted and optimized insights.

Turning to FIG. 8C, area 814 includes information about the recommendations, such as the following: The following table shows rules that are recommended for severity changes based on their impact on Resolved. False-Positive. and No-Action insights. Rules with recommended severity decreases participate in False Positive/No-Actions insights more frequently than rules that are recommended for severity increases. Before changing rule severities, checked for that rule's tunability score. Rules with high tunability scores are likely to benefit from Tuning Expressions because a small number of entities because a significant share of False Positive and No-Action insights.

Further, on the right side of area 814, more details about the table below in area 816 are provided, such as the following:

Signal Volume—number of signals in which the rule participated over the time range indicated;

Eligible: |Resolved-count|FP-count|NA-count|by Rule;

Optimized (he recommended severity changes are applied): |Resolved-count|FP-count|NA-count|by Rule;

Tunability [0-100]: Scores closer to 100 identify rules that will benefit from Tuning Expressions because a small number of entities dominate False-Positive and No-Action insights.

Area 816 includes the table described above, which includes some of the entries described above with reference to FIG. 6 plus the tunability value.

Turning to FIG. 8D, area 818 includes a description of the table for Tunable Entities by Rule showed in area 820. Tunable entities refer to the settings and configurations that can be adjusted to optimize the performance and efficiency of the platform. Some of these entities include the data ingestion rate (rate at which data is ingested), retention policies (length of time that data is retained), alerting thresholds (tuned to ensure that relevant events and anomalies are identified while minimizing false positives), etc.

The sample description of Tunable Entities is as follows:

Tunable Entities: top contributors False-Positive and no-action insights. This table shows rules that will most benefit from Tuning Expressions because a small number of entities are over-represented in False-Positive and No-Action insights where the given rule is present. Add Tuning Expressions based on the entities listed: Tunability [0-100]: closer to 100 for rules that will benefit from a tuning expression; and Entity IDs, entities that can be tuned out through a Tuning Expression.

Area 820 includes the table for the tunable entities by rule, including columns for the rule ID, entity ID, entity type, tunability number, and eligible count.

In some embodiments, recommendations for changing the weight of several rules may be presented simultaneously. For example, when the MILP analysis shows that it would be beneficial to change the weights of several rules simultaneously in order to have a greater impact on the reduction of FPs while keeping the number of TPs at the same level. However, in certain cases, it will still be beneficial to provide recommendations for a single rule because users may have specific knowledge of their IT systems and their own custom rules that may conflict with system-based recommendations.

FIG. 9 is a flowchart of a method 900 for generating recommendations to update the severity of a rule for incident-detection, according to some example embodiments. While the various operations in this flowchart are presented and described sequentially, one of ordinary skill will appreciate that some or all of the operations may be executed in a different order, be combined or omitted, or be executed in parallel.

Operation 902 is for accessing a resolution status for a plurality of insights generated based on an evaluation of one or more rules, each rule associated with a weight.

From operation 902, the method 900 flows to operation 904 to determine, based on the resolution status, if each insight corresponds to a true positive or a false positive.

From operation 904, the method 900 flows to operation 906 to optimize values for the weights of the one or more rules to lower a number of false positives. Operation 906 includes operations 908, 910, and 912. Operation 908 is for identifying an objective function based on predicted values for the insights and the resolution status received for the insights.

From operation 908, the method 900 flows to operation 910 to identify one or more constraints.

From operation 910, the method 900 flows to operation 912 to use a solver to obtain the optimized values for the one or more weights based on the objective function and the one or more constraints.

From operation 906, the method 900 flows to operation 914 for causing presentation on a user interface (UI) of a recommendation to change the weight associated with at least one rule based on the optimized values for the at least one rule.

In one example, each insight is generated based on the weights of the rules triggered by an event.

In one example, the solver is a mixed integer linear programming (MILP) program.

In one example, the objective function is to minimize a sum of differences between the resolution status from users analyzing the insights and a calculated confidence score for the insight.

In one example, causing presentation on the UI further comprises: presenting a table with one or more rules for optimization, the table including columns indicating a suggested weight change, count of true positives with current weight, count of false positives with current weight, count of true positives with recommended weight, and count of false positives with recommended weight.

In one example, causing presentation on the UI further comprises presenting a number of current insights prior to optimization, a number of eligible insights, and a number of optimized insights.

In one example, causing presentation on the UI further comprises presenting a number of eligible insights, a number of forecasted insights, and a number of optimized insights.

In one example, causing presentation on the UI further comprises presenting a table for a one or more rules, with information for each rule comprising current weight, recommended weight, eligible count, and optimized count.

In one example, the method 900 further comprises: detecting a change of the weight of a rule; calculating a number of true positives and false positives that the changed weight would have produced; and causing presentation of information on changes of true positives and false positives for the change of the weight.

In one example, the one or more rules comprise system rules and custom rules developed by a user.

Another general aspect is for a system that includes a memory comprising instructions and one or more computer processors. The instructions, when executed by the one or more computer processors, cause the one or more computer processors to perform operations comprising: accessing a resolution status for a plurality of insights generated based on an evaluation of one or more rules, each rule associated with a weight; determining, based on the resolution status, if each insight corresponds to a true positive or a false positive; optimizing values for the weights of the one or more rules to lower a number of false positives, the optimizing comprising: identifying an objective function based on predicted values for the insights and the resolution status received for the insights; identifying one or more constraints; and using a solver to obtain the optimized values for the one or more weights based on the objective function and the one or more constraints; and causing presentation on a user interface (UI) of a recommendation to change the weight associated with at least one rule based on the optimized values for the at least one rule.

In yet another general aspect, a tangible machine-readable storage medium (e.g., a non-transitory storage medium) includes instructions that, when executed by a machine, cause the machine to perform operations comprising: accessing a resolution status for a plurality of insights generated based on an evaluation of one or more rules, each rule associated with a weight; determining, based on the resolution status, if each insight corresponds to a true positive or a false positive; optimizing values for the weights of the one or more rules to lower a number of false positives, the optimizing comprising: identifying an objective function based on predicted values for the insights and the resolution status received for the insights; identifying one or more constraints; and using a solver to obtain the optimized values for the one or more weights based on the objective function and the one or more constraints; and causing presentation on a user interface (UI) of a recommendation to change the weight associated with at least one rule based on the optimized values for the at least one rule.

Figure 10:
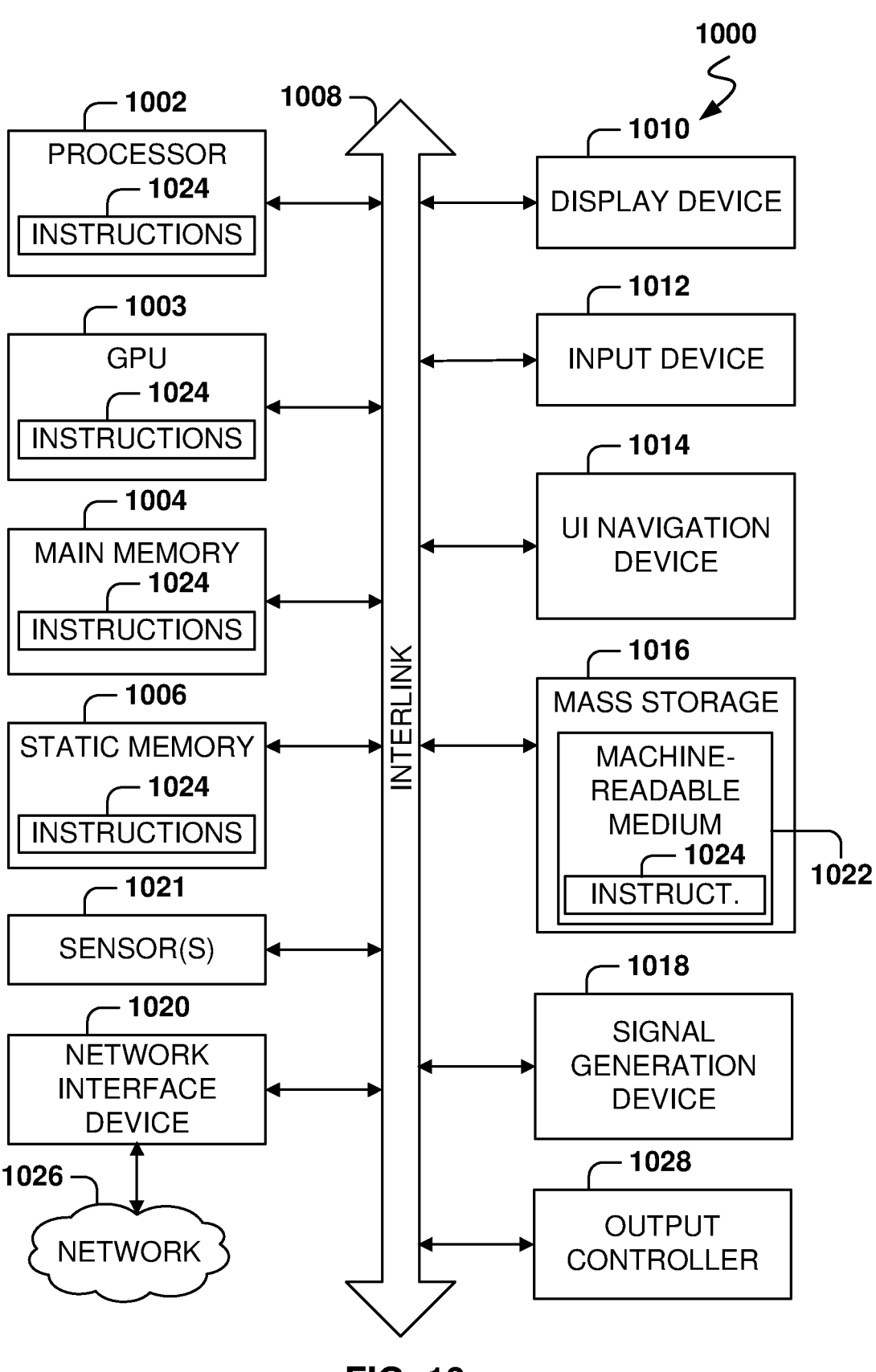
FIG. 10 is a block diagram illustrating an example of a machine upon or by which one or more example process embodiments described herein may be implemented or controlled.

FIG. 10 is a block diagram illustrating an example of a machine 1000 upon or by which one or more example process embodiments described herein may be implemented or controlled. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in a peer-to-peer (P2P) (or other distributed) network environment. Further, while only a single machine 1000 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine 1000 (e.g., computer system) may include a hardware processor 1002 (e.g., a central processing unit (CPU), a hardware processor core, or any combination thereof), a graphics processing unit (GPU 1003), a main memory 1004, and a static memory 1006, some or all of which may communicate with each other via an interlink 1008 (e.g., bus). The machine 1000 may further include a display device 1010, an alphanumeric input device 1012 (e.g., a keyboard), and a user interface (UI) navigation device 1014 (e.g., a mouse). In an example, the display device 1010, alphanumeric input device 1012, and UI navigation device 1014 may be a touch screen display. The machine 1000 may additionally include a mass storage device 1016 (e.g., drive unit), a signal generation device 1018 (e.g., a speaker), a network interface device 1020, and one or more sensors 1021, such as a Global Positioning System (GPS) sensor, compass, accelerometer, or another sensor. The machine 1000 may include an output controller 1028, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, within the hardware processor 1002, or within the GPU 1003 during execution thereof by the machine 1000. In an example, one or any combination of the hardware processor 1002, the GPU 1003, the main memory 1004, the static memory 1006, or the mass storage device 1016 may constitute machine-readable media.

While the machine-readable medium 1022 is illustrated as a single medium, the term "machine-readable medium" may include a single medium, or multiple media, (e.g., a centralized or distributed database, and/or associated caches and servers) configured to store the one or more instructions 1024.

The term "machine-readable medium" may include any medium that is capable of storing, encoding, or carrying instructions 1024 for execution by the machine 1000 and that cause the machine 1000 to perform any one or more of the techniques of the present disclosure, or that is capable of storing, encoding, or carrying data structures used by or associated with such instructions 1024. Non-limiting machine-readable medium examples may include solid-state memories, and optical and magnetic media. In an example, a massed machine-readable medium comprises a machine-readable medium 1022 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
accessing a resolution status for a plurality of insights generated based on an evaluation of one or more rules, each rule associated with a weight, wherein the weight of a rule is a numerical value indicative of a potential threat when the rule is triggered by one or more events, where the higher the numerical value, the higher a risk when the rule is triggered;
determining, based on the resolution status, if each insight corresponds to a true positive or a false positive;
optimizing values for the weights of the one or more rules to lower a number of false positives, the optimizing comprising:
identifying an objective function based on predicted values for the insights and the resolution status received for the insights;

identifying one or more constraints;
calculating a tunability score for each of the one or more rules, the tunability score for each rule being based on a number of false positive insights generated by the rule for a plurality of entities, wherein a high tunability score indicates that false positives are caused by a small number of entities; and
using a solver to obtain the optimized values for the one or more weights based on the objective function and the one or more constraints; and
causing presentation on a user interface (UI) of the tunability score and a recommendation to change the weight associated with at least one rule based on the optimized values for the at least one rule.

2. The method as recited in claim 1, wherein each insight is generated based on the weights of the rules triggered by an event.

3. The method as recited in claim 1, wherein the solver is a mixed integer linear programming (MILP) program.

4. The method as recited in claim 1, wherein the objective function is to minimize a sum of differences between the resolution status from users analyzing the insights and a calculated confidence score for the insight.

5. The method as recited in claim 1, wherein causing presentation on the UI further comprises:
presenting a table with one or more rules for optimization, the table including columns indicating a suggested weight change, count of true positives with current weight, count of false positives with current weight, count of true positives with recommended weight, and count of false positives with recommended weight.

6. The method as recited in claim 1, wherein causing presentation on the UI further comprises:
presenting a number of current insights, a number of eligible insights, and a number of optimized insights, wherein the current insights comprise the insights generated based on the evaluation of the one or more rules, wherein the eligible insights comprise insights remaining after filtering the current insights, and wherein the optimized insights comprise insights after severity changes are applied to the eligible insights.

7. The method as recited in claim 6, wherein causing presentation on the UI further comprises:
presenting a number of forecasted insights, wherein the number of forecasted insights comprise unlabeled insights resulting from rules with severity increases.

8. The method as recited in claim 1, wherein causing presentation on the UI further comprises:
presenting a table for the one or more rules with information for each rule comprising a current weight, a recommended weight, a number of insights for the current weight, and the number of insights for the recommended weight.

9. The method as recited in claim 1, further comprising:
detecting a change of the weight of a rule;
calculating a number of true positives and false positives that the changed weight would have produced; and
causing presentation of information on changes of true positives and false positives for the change of the weight.

10. The method as recited in claim 1, wherein the one or more rules comprise system rules and custom rules developed by a user.

11. The method as recited in claim 1, wherein each entity from the plurality of entities comprises one or more of username, email address, or IP address.

12. The method as recited in claim 1, wherein calculating the tunability score comprises:

identifying entities associated with false positive insights generated by each rule of the one or more rules;

determining a concentration of the entities with false positive insights among the number of entities; and calculating the tunability score based on a ratio of false positive insights to the number of entities generating the false positive insights, wherein the tunability score indicates a concentration level of false positive insights among a subset of entities.

13. A system comprising:

a memory comprising instructions; and one or more computer processors, wherein the instructions, when executed by the one or more computer processors, cause the system to perform operations comprising:

accessing a resolution status for a plurality of insights generated based on an evaluation of one or more rules, each rule associated with a weight, wherein the weight of a rule is a numerical value indicative of a potential threat when the rule is triggered by one or more events, where the higher the numerical value, the higher a risk when the rule is triggered;

determining, based on the resolution status, if each insight corresponds to a true positive or a false positive;

optimizing values for the weights of the one or more rules to lower a number of false positives, the optimizing comprising:

identifying an objective function based on predicted values for the insights and the resolution status received for the insights;

identifying one or more constraints;

calculating a tunability score for each of the one or more rules, the tunability score for each rule being based on a number of false positive insights generated by the rule for a plurality of entities, wherein a high tunability score indicates that false positives are caused by a small number of entities; and using a solver to obtain the optimized values for the one or more weights based on the objective function and the one or more constraints; and causing presentation on a user interface (UI) of the tunability score and a recommendation to change the weight associated with at least one rule based on the optimized values for the at least one rule.

14. The system as recited in claim 13, wherein each insight is generated based on the weights of the rules triggered by an event.

15. The system as recited in claim 13, wherein the solver is a mixed integer linear programming (MILP) program.

16. The system as recited in claim 13, wherein the objective function is to minimize a sum of differences between the resolution status from users analyzing the insights and a calculated confidence score for the insight.

17. The system as recited in claim 13, wherein causing presentation on the UI further comprises:

presenting a table with one or more rules for optimization, the table including columns indicating a suggested weight change, count of true positives with current weight, count of false positives with current weight, count of true positives with recommended weight, and count of false positives with recommended weight.

18. A non-transitory machine-readable storage medium including instructions that, when executed by a machine, cause the machine to perform operations comprising:

accessing a resolution status for a plurality of insights generated based on an evaluation of one or more rules, each rule associated with a weight, wherein the weight of a rule is a numerical value indicative of a potential threat when the rule is triggered by one or more events, where the higher the numerical value, the higher a risk when the rule is triggered;

determining, based on the resolution status, if each insight corresponds to a true positive or a false positive;

optimizing values for the weights of the one or more rules to lower a number of false positives, the optimizing comprising:

identifying an objective function based on predicted values for the insights and the resolution status received for the insights;

identifying one or more constraints;

calculating a tunability score for each of the one or more rules, the tunability score for each rule being based on a number of false positive insights generated by the rule for a plurality of entities, wherein a high tunability score indicates that false positives are caused by a small number of entities; and using a solver to obtain the optimized values for the one or more weights based on the objective function and the one or more constraints; and causing presentation on a user interface (UI) of the tunability score and a recommendation to change the weight associated with at least one rule based on the optimized values for the at least one rule.

19. The non-transitory machine-readable storage medium as recited in claim 18, wherein the objective function is to minimize a sum of differences between the resolution status from users analyzing the insights and a calculated confidence score for the insight.

20. The non-transitory machine-readable storage medium as recited in claim 16, wherein causing presentation on the UI further comprises:

presenting a table with one or more rules for optimization, the table including columns indicating a suggested weight change, count of true positives with current weight, count of false positives with current weight, count of true positives with recommended weight, and count of false positives with recommended weight.

* * * * *